United States Patent [19]

Mallet

[11] 4,436,515

[45] Mar. 13, 1984

[54] ARTICULATION DEVICE HAVING A DOUBLE UNIVERSAL JOINT AND A BALL JOINT UNIT

[75] Inventor: Bernard Mallet, Limay, France

[73] Assignee: Nadella, Rueil Malmaison, France

[21] Appl. No.: 421,802

[22] Filed: Sep. 23, 1982

[30] Foreign Application Priority Data

Oct. 23, 1981 [FR] France .................... 81 19926

[51] Int. Cl.³ ................. F16D 3/26; F16D 3/30
[52] U.S. Cl. ................. 464/114; 464/118; 464/905
[58] Field of Search ............. 464/112–114, 464/117, 118, 904, 905

[56] References Cited

U.S. PATENT DOCUMENTS

| 1,281,918 | 10/1918 | Ecaubert | 464/114 |
| 1,898,265 | 2/1933 | Ragan | 464/114 |
| 1,979,768 | 11/1934 | Pearce | 464/118 |
| 3,427,824 | 2/1969 | Mayrath | 464/117 |

*Primary Examiner*—John Petrakes

*Attorney, Agent, or Firm*—Robert E. Burns; Emmanuel J. Lobato; Bruce L. Adams

[57] ABSTRACT

The device is adapted to ensure the transmission of a movement of rotation between a driving shaft and a driven shaft which are adapted to be rendered respectively rigid with a first universal joint fork member (1) and a second universal joint fork member (6). The fork members each carry elements (11, 12) of the ball joint unit and are connected by spiders (14, 9) to intermediate connecting means (5). Each of the elements (11, 12) of the ball joint unit is constructed in the form of a fork member (13, 14) whose branches are engaged in the branches (3, 8) of the corresponding fork member of the articulation device and in contact with the branches (3, 8) and whose web carries a projection (22) cooperating with a complementary projection (24) provided on the other element (12). The fork members (13, 14) of each of the elements of the ball joint unit have in their branches transverse apertures (15, 16) receiving inwardly projecting portions of rolling bearings (19, 20) by means of which bearings the spiders (4, 9) are mounted in the branches (3, 8) of the fork members (1, 6) of the articulation device.

9 Claims, 7 Drawing Figures

ARTICULATION DEVICE HAVING A DOUBLE UNIVERSAL JOINT AND A BALL JOINT UNIT

DESCRIPTION

The present invention relates to articulation devices having a double universal joint and a ball joint unit.

Such devices are already known for ensuring a substantially homokinetic transmission between a driving shaft and a driven shaft.

For this purpose, each of the shafts is rigid with a universal joint fork member which carries one of the elements of the ball joint unit.

Further, said fork members are interconnected through an intermediate connecting means by means of spiders.

In some of the known devices of this type, the members forming the ball joint unit elements extend through bores formed for this purpose in the spiders. Such an arrangement requires increasing their overall size, and consequently the overall size of the articulation device, in addition to the fact that it weakens the strength of the spiders.

In order to avoid the use of a spider provided with a central bore for the passage of the members carrying the elements of the ball joint unit, it has been proposed to form the fork members in the shape of a closed fork member incorporating the elements of the ball joint unit.

Such arrangements require the construction of parts which are special and consequently expensive.

In order to overcome this drawback, it has also been to construct the articulation devices having a double universal joint with the use of fork members of ordinary construction disposed back-to-back, the ball joint unit being formed by mounted parts which cooperate with the hubs of said fork members.

This arrangement is much cheaper but, on one hand, requires the construction with high precision of the mounted parts adapted to form the ball joint unit and, on the other hand, poses problems of connection between the fork members and the shafts.

This problem is solved by forming the branches of the fork members in such manner that the latter have connecting tabs for connection with a flange mounted at the end of each of the shafts to be coupled.

An object of the invention is to overcome the aforementioned drawback of the prior art devices and to provide a device having a double universal joint in which the elements constituting the ball joint unit are so constructed that their mounting requires no modification of the elements constituting the device.

The invention therefore provides an articulation device having a double universal joint and a ball joint unit adapted to ensure the transmission of a movement of rotation between a driving shaft and a driven shaft adapted to be rendered rigid respectively with a first universal joint fork member and a second universal joint fork member, which fork members each carry elements of the ball joint unit and are connected by spiders to an intermediate connecting means, wherein each of the elements of the ball joint unit is itself constructed in the form of a fork member whose branches are engaged between the branches of the corresponding fork member of the device and in contact with said branches, and whose web carries a projection which cooperates with a complementary projection provided on the other element, the fork members of each of said elements of the ball joint unit having in their branches transverse apertures receiving the inwardly projecting portions of the rolling bearings by means of which bearings the spiders are mounted in the branches of the fork members of the articulation device.

Further features of the invention will be apparent from the ensuing description which is given solely by way of example with reference to the accompanying drawings in which.

Figure 1:
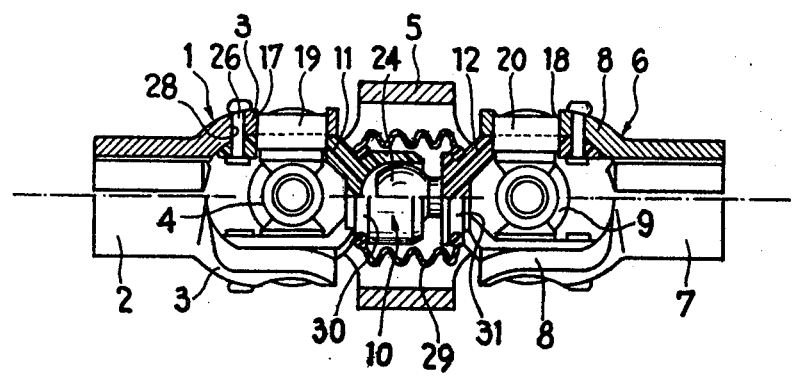
FIG. 1 is an elevational view, partly in section, of the articulation device according to the invention.

The articulation device shown in FIG. 1 comprises a first fork member 1 whose hub 2 is adapted to be rendered rigid with a driving shaft (not shown) and whose branches 3 are connected through a spider 4 to an intermediate connecting means 5 for connection to a second fork member 6. The latter comprises a hub 7 adapted to receive a driven shaft (not shown) and branches 8 carrying a spider 9 by means of which said second fork member is connected to the intermediate connecting means 5.

The device further comprises a ball joint unit generally designated by the reference numeral 10 and comprising a first element 11 mounted in the fork member 1 and a second element 12 mounted in the fork member 6.

Figure 2:
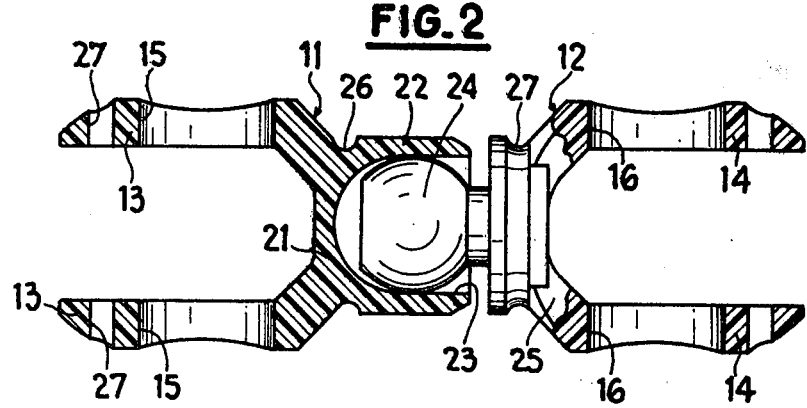
FIG. 2 is a sectional view to an enlarged scale of the elements of the device shown in FIG. 1 which constitute the ball joint unit of the device.

This unit, which is shown in more detail in FIG. 2, is made from a plastics material having sufficient strength, bearing in mind the stresses to which the articulation device is subjected, and sufficient resilience to satisfy the requirements of assembly. Nylon is a material which is quite suitable for the construction of the elements of the ball joint unit. Each of these units has a fork member 13, 14 whose outside dimensions are such that they are adapted to the inside dimensions of the fork members 1 and 6 of the articulation device. The branches of the fork members 13 and 14 are provided with respective transverse apertures 15 and 16 whose diameters are equal to each other and to the diameters of the transverse bores 17, 18 provided in the branches of the fork members 1 and 6 and in which are engaged the rolling bearings 19, 20 of the spiders 4, 9.

As can be seen in FIG. 1, the rolling bearings 19, 20 have an axial extent which exceeds the thickness of the branches of the fork members 1 and 6 so that the inner portion of each of these rolling bearings projects inwardly from each of the branches. These projecting portions of the rolling bearings have been employed by the Applicant to ensure the fixing and maintenance of the fork members of each of the elements 11 and 12 of the ball joint unit by the introduction of said portions in the transverse apertures 15 and 16 of the last-mentioned fork members.

The ball joint unit 11 further comprises a web 21 and a cylindrical projection 22 opposed to the fork member 13. Formed in the projection 22 is an axial bore 23 in which there is engaged a ball 24 which projects from the web 25 of the other element 12 of the ball joint unit.

In the embodiment shown in FIG. 1, each of the branches 13, 14 of the fork members 11, 12 constituting said ball joint unit is transversely immobilized by a rivet 26 which extends through an orifice 27 formed in the end of each of said branches and an aperture 28 provided in the vicinity of the base of each of the branches 3, 8 of the fork members 1 and 6 of the articulation device.

In some applications, in which the forces to which the articulation device is subjected do not urge the fork members of the ball joint elements to move in rotation relative to the fork members of the articulation device, the fact that the branches 3 and 8 of the fork members of this device have, in cross-section, a marked curvature and the outer surface of the branches of the fork members 13, 14 of the ball joint unit element have a complementary curvature, prevents any lateral movement of the fork members in contact which are moreover immobilized by the bearings 19, 20 of the spiders 4 and 9.

As can be seen in FIG. 1, a protecting bellows 29 is secured in peripheral grooves 30, 31 provided in the webs of the elements 11 and 12 of the ball joint unit so as to protect the engaged parts of the latter.

Figure 3:
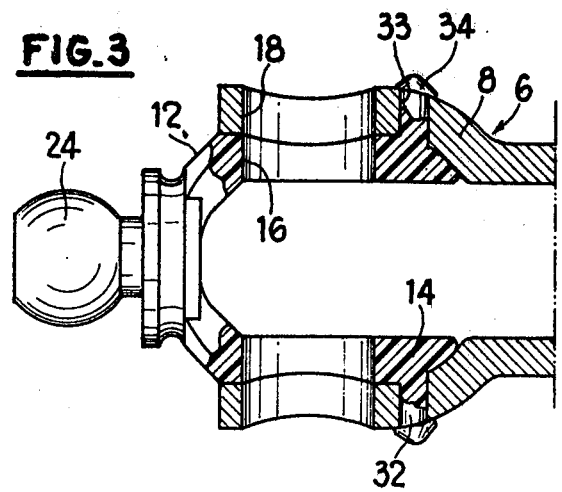
FIG. 3 is a sectional view of a first manner of transversely immobilizing one of the elements constituting the ball joint unit in the corresponding fork member of the articulation device according to the invention.

In FIG. 3, which shows the male element 12 of the ball joint unit, the branches of the fork member 14 are prevented from rotating relative to the branches 8 of the fork member 6 of the articulation device by studs 32 which are moulded with the element 12 and engaged in apertures 33 provided in the vicinity of the base of each of the branches 8 and comprise retaining heads 34 at the ends of the studs.

It will be understood that the female element corresponding to the male element shown in FIG. 3 has the same means for preventing the rotation of its branches relative to the branches of the corresponding fork member of the articulation device.

Figure 4:
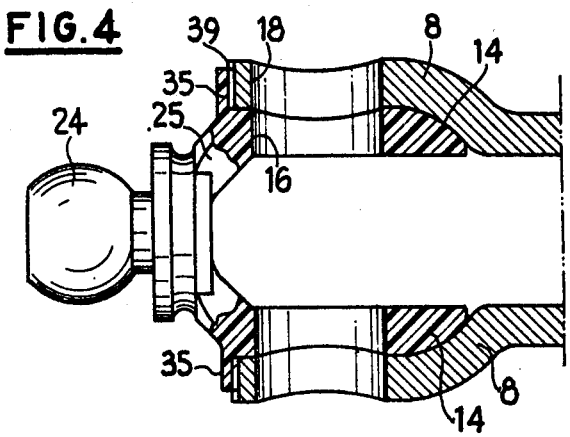
FIG. 4 is a view similar to FIG. 3 of another manner of transversely immobilizing one of the elements forming said ball joint unit in the corresponding fork member of the device.
Figure 5:
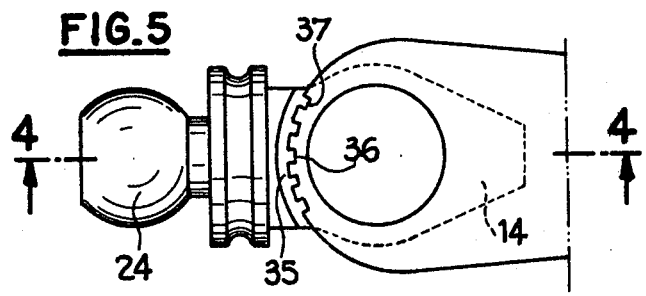
FIG. 5 is a top plan view of the arrangement shown in Fig. 4.

FIGS. 4 and 5, in which only the male element has been shown, depict another manner of preventing rotation of the branches of the ball joint elements relative to the branches of the fork members of the articulation device.

As can be seen in FIG. 4, the web 25 of the fork member 14 has two transverse projections 35 which extend outwardly relative to the base of each of the branches of said fork member. These projections are curved and centered on the transverse apertures 16 and have an internal set of teeth 36 which is engaged with corresponding teeth 37 provided on the end of each of the branches 8 of the fork member 6 of the articulation device.

Figure 6:
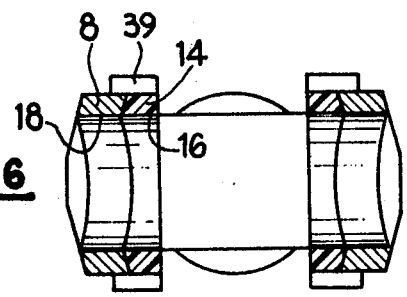
FIG. 6 is a cross-sectional view of a modification of the means for immobilizing an element forming the ball joint unit in the corresponding fork member of the device.

FIG. 6 shows in cross-section still another manner of preventing rotation of the fork members of the ball joint unit relative to the fork members of the articulation device.

In this FIG. 6, which will be considered to represent the path corresponding to the parts shown in FIGS. 3 to 5, the branches of the fork member 14 of the ball joint unit each comprise lateral projections 39 which engage with lateral surfaces of the branches 8 of the fork member 6 of the articulation device and thereby prevent any rotation of the fork member 14 relative to the fork member 6 around the rolling bearings of the spiders (not shown) by which they are maintained. The lateral projections 39 may be provided either in the vicinity of the base or in the vicinity of the free end of each of the branches 14 of the fork member of the ball joint element. It will be understood that the other element of the ball joint is provided with branch immobilizing projections similar to the projections 39 shown in FIG. 6.

Figure 7:
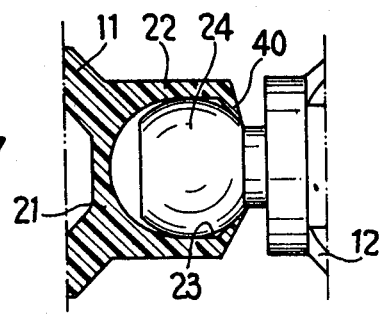
FIG. 7 is a partial sectional view of a modification of the sealing means for the ball joint unit of the device according to the invention.

FIG. 7 shows an embodiment of sealing means employed for protecting the articulation of the ball joint unit of the device according to the invention.

This FIG. 7 shows that the axial bore 19 of the female ball joint element 11 is provided with a peripheral end lip portion 40 which is moulded thereon and which, while it allows the engagement of the ball-shaped end 24 of the complementary element 12, thereafter ensures, owing to its resilience, the sealing of the articulation achieved. Such an arrangement advantageously replaces the protection by means of the bellows over which it has the advantage of simplicity of construction and assembly.

The originality of the device just described resides in the fact that the ball joint unit is constructed in two main elements fixed inside end fork members of the articulation device. Further, the forces resulting from the presence of the ball joint unit are supported by this unit owing to the fact that these two elements are maintained in position by the passage of the bearings of the associated spiders in the branches of the elements of the ball joint unit.

There is thus obtained a device which combines simplicity of construction with a small overall size so that it requires no dimensional modification of a similar device which would not have a ball joint unit.

Having now described my invention what I claim as new and desire to secure by Letters Patent is :

1. An articulation device comprising two universal joints, intermediate connecting means for interconnecting the two universal joints, and a ball joint unit, said device being provided for transmitting a movement of rotation between a driving shaft and a driven shaft which are adapted to be rendered rigid respectively with a fork member of a first of said universal joints and a fork member of a second of said universal joints, the ball joint unit comprising a first element and a second element respectively carried by said two fork members, spiders, rolling bearings connecting said two fork members to said intermediate connecting means through said spiders, each of the elements of the ball joint unit being constructed in the form of a fork member having branches which are respectively engaged between and in contact with branches of the corresponding fork member of said first and second universal joints, the fork members of the ball joint unit each having a web which carries a projection which cooperates with a complementary projection provided on the web of the other fork member of the ball joint unit, the fork members of the ball joint unit defining in their branches transverse apertures receiving inwardly projecting portions of said rolling bearings by means of which rolling bearings the spiders are mounted in the branches of the fork members of the first and second universal joints.

2. A device according to claim 1, wherein said projection of one of the elements of the ball joint unit defines an axial bore in which bore is engaged a ball constituting said projection of the other element of the ball joint unit.

3. A device according to claim 1, wherein the branches of said fork members of the first and second universal joints have a curvature in transverse planes and outer surfaces of the branches of the fork members of the ball joint unit have a complementary curvature which ensures a transverse immobilization of the branches of the fork members of the ball joint unit relative to the branches of the fork members of the first and second universal joints.

4. A device according to claim 1, 2 or 3, further comprising complementary means for transversely immobilizing the branches of the fork members of the ball joint unit relative to the branches of the fork members of the first and second universal joints.

5. A device according to claim 4, wherein said complementary immobilizing means comprise a rivet engaged in an aperture formed in an end of each branch of the fork members of the ball joint unit and in a corresponding aperture provided in each branch of the fork members of the first and second universal joints.

6. A device according to claim 4, wherein said complementary immobilizing means comprise a stud which is in one piece with each branch of the fork members of the ball joint unit and is engaged in a corresponding aperture formed in each branch of the fork members of the first and second universal joints.

7. A device according to claim 4, wherein said complementary immobilizing means comprise a projection which is in one piece with the web of each of the fork members of the ball joint unit, the last-mentioned projection having a set of teeth which cooperates with a complementary set of teeth provided on an end portion of the corresponding branch of the fork member of the first and second universal joints, in which last-mentioned fork member the fork member of the ball joint unit is mounted.

8. A device according to claim 4, wherein said complementary immobilizing means comprise two lateral projections which are in one piece with each of the branches of the fork members of the ball joint unit and are in contact with corresponding lateral portions of each of the branches of the fork members of the first and second universal joints.

9. A device according to claim 2 or 3, comprising sealing means for engaged portions of the elements of the ball joint unit, said sealing means being formed by a lip which is in one piece with the element of the ball joint unit in which is formed said axial bore, said lip being located at an open end of said bore and having sufficient resilience to permit the engagement in said bore of the ball of the other element of the ball joint unit and thereafter ensure a sealing of the articulation thus achieved between the elements of the universal ball joint unit.

* * * * *